United States Patent
Erickson et al.

(10) Patent No.: US 9,322,995 B2
(45) Date of Patent: Apr. 26, 2016

(54) OPTICAL FORCE BASED BIOMOLECULAR ANALYSIS IN SLOT WAVEGUIDES

(75) Inventors: David Erickson, Ithaca, NY (US); Michal Lipson, Ithaca, NY (US); Allen Yang, Santa Barbara, CA (US); Brad Schmidt, Toronto (CA); Sean Moore, Colden, NY (US)

(73) Assignee: Cornell University, Ithaca, NY (US)

( * ) Notice: Subject to any disclaimer, the term of this patent is extended or adjusted under 35 U.S.C. 154(b) by 52 days.

(21) Appl. No.: 13/062,867

(22) PCT Filed: Sep. 11, 2009

(86) PCT No.: PCT/US2009/056731
§ 371 (c)(1),
(2), (4) Date: Oct. 28, 2011

(87) PCT Pub. No.: WO2010/030939
PCT Pub. Date: Mar. 18, 2010

(65) Prior Publication Data
US 2012/0033915 A1    Feb. 9, 2012

Related U.S. Application Data

(60) Provisional application No. 61/191,841, filed on Sep. 12, 2008.

(51) Int. Cl.
G02B 6/12      (2006.01)
G02B 6/122    (2006.01)
G02B 6/125    (2006.01)

(52) U.S. Cl.
CPC .............. *G02B 6/122* (2013.01); *G02B 6/125* (2013.01); *G02B 6/12007* (2013.01); *G02B 2006/12061* (2013.01); *G02B 2006/12147* (2013.01)

(58) Field of Classification Search
CPC .............. G02B 6/125; G02B 6/12007; G02B 2006/12147
USPC .......................................................... 385/42
See application file for complete search history.

(56) References Cited

U.S. PATENT DOCUMENTS 6,208,791 B1 *  3/2001  Bischel et al. ................. 385/129
6,262,426 B1    7/2001  Zafiratos
(Continued)

FOREIGN PATENT DOCUMENTS

WO    WO-2006029450 A2    3/2006
WO    WO-2009056371 A1    5/2009
WO    WO-2010030939 A1    3/2010

OTHER PUBLICATIONS

"International Application Serial No. PCT/US2009/056731, Search Report mailed Nov. 2, 2009".

(Continued)

*Primary Examiner* — Ryan Lepisto
*Assistant Examiner* — Mary A El Shammaa
(74) *Attorney, Agent, or Firm* — Schwegman Lundberg & Woessner, P.A.

(57) ABSTRACT

An architecture for the handling and transport of nanoscopic matter in lab on a chip devices using optical forces. A slot waveguide is used to focus and harness optical energy to trap and transport nanoscale objects. The slot waveguide is a unique structure that has several advantageous features, such as high optical confinement, and enables nanoparticles to interact fully with a propagating optical mode.

12 Claims, 8 Drawing Sheets

(56) References Cited

U.S. PATENT DOCUMENTS

| | | | |
|---|---|---|---|
| 7,288,776 | B2 | 10/2007 | Lee et al. |
| 7,339,724 | B2 | 3/2008 | Hochberg et al. |
| 7,371,327 | B2 | 5/2008 | Cross |
| 7,449,679 | B2 | 11/2008 | Plewa et al. |
| 7,995,890 | B2 * | 8/2011 | Schmidt et al. ............... 385/129 |
| 2002/0003928 | A1 * | 1/2002 | Bischel et al. .................. 385/39 |
| 2004/0179808 | A1 | 9/2004 | Renn |
| 2006/0157713 | A1 * | 7/2006 | Linares et al. .................. 257/77 |
| 2006/0201811 | A1 | 9/2006 | Hamers et al. |
| 2006/0228074 | A1 * | 10/2006 | Lipson et al. ................... 385/42 |
| 2006/0234419 | A1 * | 10/2006 | Linares et al. ................ 438/105 |
| 2006/0251371 | A1 | 11/2006 | Schmidt et al. |
| 2006/0257089 | A1 * | 11/2006 | Mueth et al. .................. 385/125 |
| 2007/0237460 | A1 * | 10/2007 | Fan et al. ........................ 385/39 |
| 2007/0289623 | A1 * | 12/2007 | Atwater ........................ 136/252 |
| 2008/0138010 | A1 * | 6/2008 | Dou et al. ........................ 385/16 |
| 2008/0193133 | A1 | 8/2008 | Krug et al. |
| 2008/0231939 | A1 | 9/2008 | Gluckstad |

OTHER PUBLICATIONS

"International Application Serial No. PCT/US2009/056731, Written Opinion mailed Nov. 2, 2009".

Barrios, C. A., "Optical Slot-Waveguide Based Biochemical Sensors", Sensors, 9, (2009), 4751-4765.

"Chinese Application Serial No. 200980145053.X, Office Action mailed Aug. 27, 2012", (w/ English Translation), 16 pgs.

"Chinese Application Serial No. 200980145053.X, Response filed Feb. 4, 2013 to Office Action mailed Aug. 27, 2012", (w/ English Translation of Claims), 12 pgs.

"International Application Serial No. PCT/US2009/056731, International Preliminary Report on Patentability mailed Mar. 24, 2011", 6 pgs.

"Chinese Application Serial No. 200980145053.X, Office Action mailed Apr. 3, 2013", With English Translation, 8 pgs.

"Chinese Application Serial No. 200980145053.X, Office Action mailed Oct. 22, 2013", With English Translation, 12 pgs.

"Chinese Application Serial No. 200980145053.X, Office Action mailed Jun. 4, 2014", With English Translation, 14 pgs.

"Chinese Application Serial No. 200980145053.X, Response filed Feb. 7, 2014 to Office Action mailed Oct. 22, 2013", (w/ English Translation of Amended Claims), 11 pgs.

"Chinese Application Serial No. 200980145053.X, Office Action mailed Dec. 31, 2014", 14 pgs.

\* cited by examiner t = -0.2s   t = 0s   t = 1.35s t = 2.45s   t = 2.6s   t = 2.8s

OPTICAL FORCE BASED BIOMOLECULAR ANALYSIS IN SLOT WAVEGUIDES

RELATED APPLICATION

This application is a nationalization under 35 U.S.C. 371 of PCT/US2009/056731, filed Sep. 11, 2009 and published as WO 2010/030939 A1 on Mar. 18, 2010 which claims priority to U.S. Provisional Application Ser. No. 61/191,841 (entitled OPTICAL FORCE BASED BIOMOLECULAR ANALYSIS IN SLOT WAVEGUIDES, filed Sep. 12, 2008) which applications and publications are incorporated herein by reference in their entirety.

GOVERNMENT FUNDING

This invention was made with Government support under Grant Number 0708599 awarded by National Science Foundation. The United States Government has certain rights in the invention.

BACKGROUND

Lab on a chip devices suffer from difficulties associated with sensing and transporting small samples. There is enormous potential of integrating optical and microfluidic elements into lab-on-a-chip devices, particularly in enhancing fluid and particle manipulations. Traditionally accomplished through direct particle manipulation with laser tweezers, or indirectly using optically induced microfluidic effects, the precision with which particles can be manipulated with these techniques makes them particularly useful for applications ranging from flow cytometry to self-assembly.

Fundamentally however, these free-space systems are limited in two ways. Firstly, diffraction limits how tightly the light can be focused and thereby the overall strength of the trap. Secondly, the trapping region has a very short focal depth preventing the continuous transport of nanoparticles via radiation pressure. To improve trapping stability a number of near-field methods have recently been developed. In one prior art method, interfering Gaussian beams are reflected off a prism surface to sort 350 nm polystyrene beads. In a further method, localized plasmonic resonances in surface bound metallic nanostructures are used to trap 200 nm dielectric particles.

Waveguide based optical transport is analogous to these near field methods in that the evanescent field extending into the surrounding liquid serves to attract particles to the waveguide. However, particles also experience photon scattering and absorption forces which propel them along it for a distance limited only by the losses in the system. Recent efforts in this area have demonstrated the sustained propulsion of dielectric microparticles, metallic nanoparticles and cells. The limitation which prevents these systems from manipulating smaller matter, including biomolecules, is that the particles only interact with the small portion of total transported light since the majority of it is confined within the solid core of the waveguide.

SUMMARY

An architecture for the handling and transport of small matter, such as nanoparticles and biological molecules in lab on a chip devices. A slot waveguide is used to focus and harness optical energy to trap and transport the small matter objects. The slot waveguide is a unique structure that has several advantageous features, such as high optical confinement, and enabling small matter to interact fully with a propagating optical mode.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A sub-wavelength liquid core slot waveguide may used for optofluidic transport. The technique simultaneously exploits near field optical forces to confine matter inside the waveguide and scattering/adsorption forces to transport it. The ability of the slot waveguide to condense the accessible electromagnetic energy to scales as small as 60 nm or less helps overcome fundamental diffraction limitations of prior devices. In various embodiments, the slot waveguide may be used for trapping and transport of dielectric nanoparticles as small as 75 nm or much smaller, as well as biomolecules such as DNA molecules. Since trapping occurs along a line defined by the slot, as opposed to at a point as with traditional point traps, the slot waveguide provides the unique ability to directly handle extended biomolecules. Various embodiments described may help bridge the gap between optical manipulation and nanofluidics.

The slot waveguide provides the ability to trap and transport nanoscale dielectric particles and DNA. Devices incorporating the slot waveguide can be integrated into lab-on-a-chip platforms using existing manufacturing techniques and enables discrete optical manipulation and transport of nanoscopic objects with greater precision than is available with existing approaches. The fusion of nanofluidics and optical manipulation in this manner will enable new methods of bioanalysis and directed assembly.

Figure 1A:
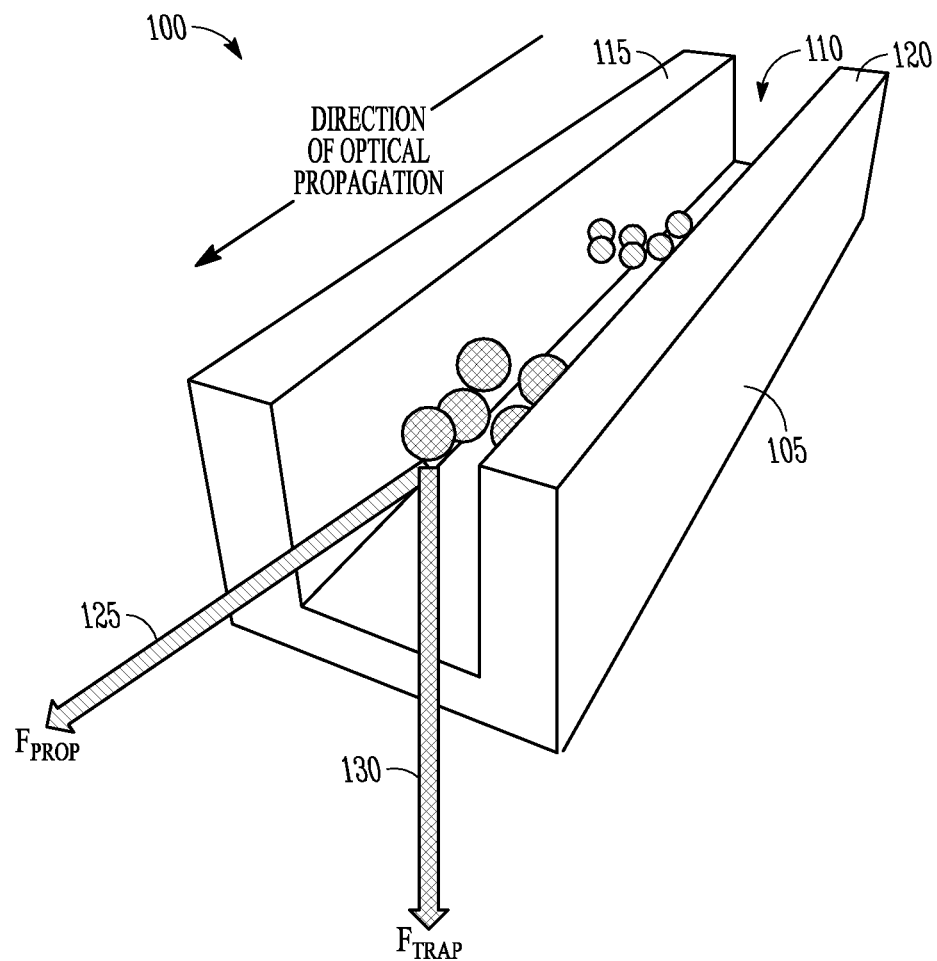
FIG. 1A is a perspective block representation of a slot waveguide according to an example embodiment.

FIG. 1A is a perspective illustration of a nanophotofluidic or optofluidic transport system at 100. System 100 includes a slot waveguide 105 is comprised of a nanoscale slot 110 having a relatively low refractive index, sandwiched between two walls 115, 120 of significantly higher refractive index. FIG. 1A also illustrates the transport of two different sizes of particles in the slot waveguide 105. Two different force vectors, $F_{prop}$ at 125 and $F_{trap}$ at 130 are illustrated. $F_{prop}$ 125, represents a radiation pressure force responsible for optofluidic transport while $F_{trap}$ 130 represents a trapping force that holds nanoparticles within the slot region. A direction of optical propagation is illustrated by arrow 135, and is generally along the line of the slot 110.

Figure 1B:
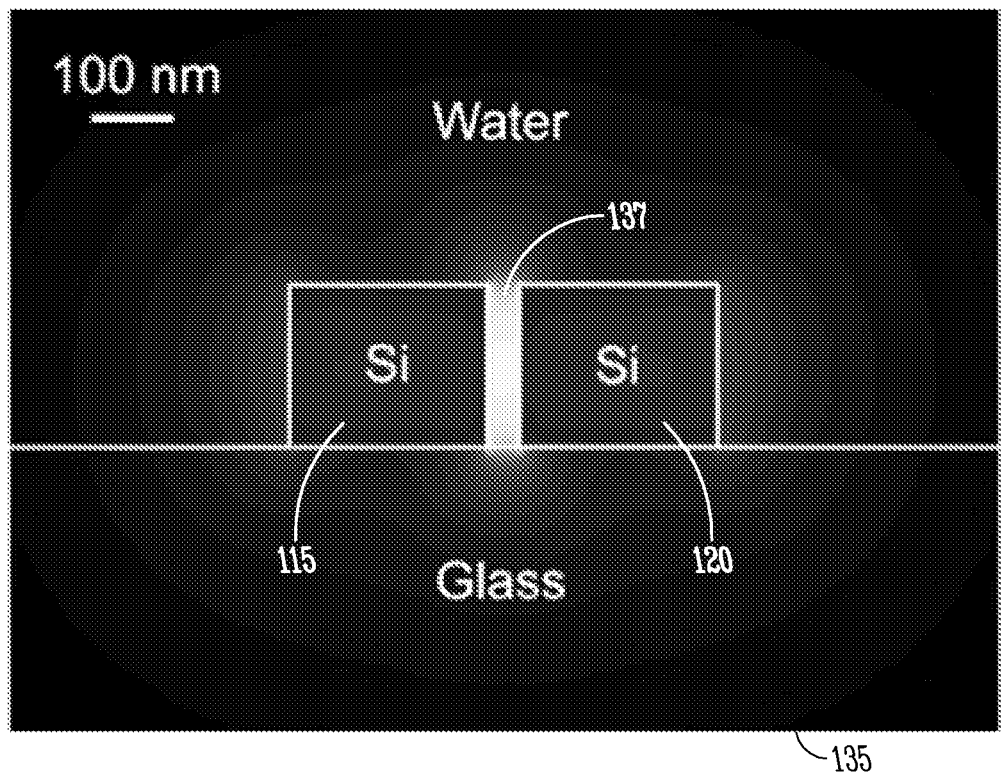
FIG. 1B is a cross section of the slot waveguide of FIG. 1A further illustrating an eigenmode according to an example embodiment.

FIG. 1B is a cross section representation of the system 110, wherein the walls 115, 120 are shown formed on a glass substrate 135. A pseudo transverse-electric (TE) mode is illustrated that exhibits a large electric field discontinuity at horizontal boundaries of the slot region. The result is a high-intensity eigenmode 137 in the slot making the majority of the optical energy is accessible within the low-index slot 110. In one embodiment, a 40 nm slot waveguide may be immersed in water. In further embodiments, the slot may range in width from 40 nm to 200 nm. A main trapping region is in the high-intensity slot mode, although alternate trapping locations are located on the sides of the waveguide, where may be two decaying evanescent modes.

In one embodiment, a fluid is provided in the slot 110 to provide for transport of particles in a fluid region of the slot 110. Sub-wavelength scale slot waveguides may be used to optically capture, trap, and transport both dielectric nanoparticles and biomolecules such as DNA molecules and proteins. Stable trapping of particles as small as 75 nm is demonstrated which is some of the smallest dielectric matter ever trapped or transported using such a system.

Optical transport of small particles and molecules of matter may be enabled by the ability of the slot waveguide to generate extremely high optical intensities by condensing the accessible electromagnetic energy down to scales at least as small as 40 nm and maintain impulses of the energy over indefinitely long distances. In one embodiment, the slot waveguides traps along a line, as opposed to at a point as with traditional optical tweezers. Such trapping provides the unique ability to manipulate long chain biomolecules in a partially extend state, as opposed to a supercoiled state. Sections below provide an examination of the effect the presence of a particle has on the optical mode, details of the trap strength and stiffness in comparison with other techniques, and a unique stability analysis descriptive of the release kinetics for particles near the stability point.

In various embodiments, the system exploits a combination of transverse optical gradient forces to confine biological and non-biological targets within the slot, such as a 50 nm slot, or other slots ranging from 40 nm or less to larger slots, such as 200 nm or more. Targets may include a large variety of particles, including DNA, proteins and other biological targets, and nanoparticles, carbon nanotubes, quantum dots and other non-biological targets. Optical and fluidic confinement at this dimension level allow for ultra compact, high speed, nanofluidic manipulation at length scales and under conditions that make the use of traditional techniques impossible.

In some embodiments, the system may be used for separation of organic and inorganic species. The optical power may be confined spatially to as little as 40 nm and the index confinement enables indefinitely long interaction lengths along the slot. Optical forces are generally stronger on larger particles. As a result, smaller particles more slower than larger particles. As such, an initial mixture of particles may be separated into its constituent components. Small particles may thus be separated with an order of magnitude more precision than by other current methods.

In further embodiments, the system may be used as a tool to study the physics of single protein folding dynamics. Measurements on unconfined proteins are limited to the amount of time it takes for the protein to diffuse across a focal spot of a laser in prior methods. The traps provided in the disclosed system may be sufficiently stable to confine individual proteins essentially indefinitely, enabling a breakthrough in the study of protein folding dynamics.

Figure 1C:
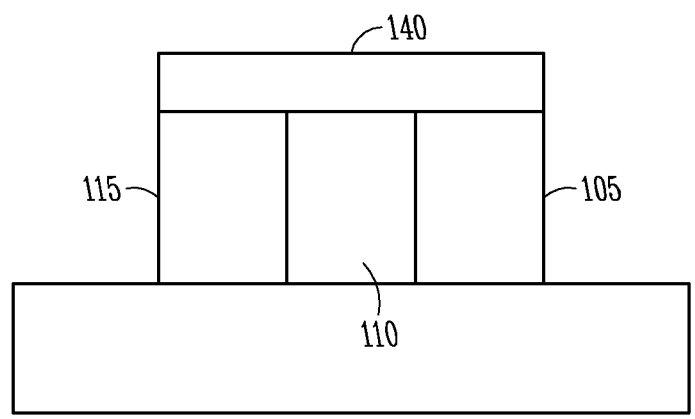
FIG. 1C is a cross section representation of a slot waveguide with a cover according to an example embodiment.

FIG. 1C is a section representation of a slot waveguide with a cover 140 according to an example embodiment. In further embodiments, the slot 110 may be provided with the cover 140 for at least part of it's length. Particles may be fluidically transported into the slot through longitudinal flow.

Figure 2A:
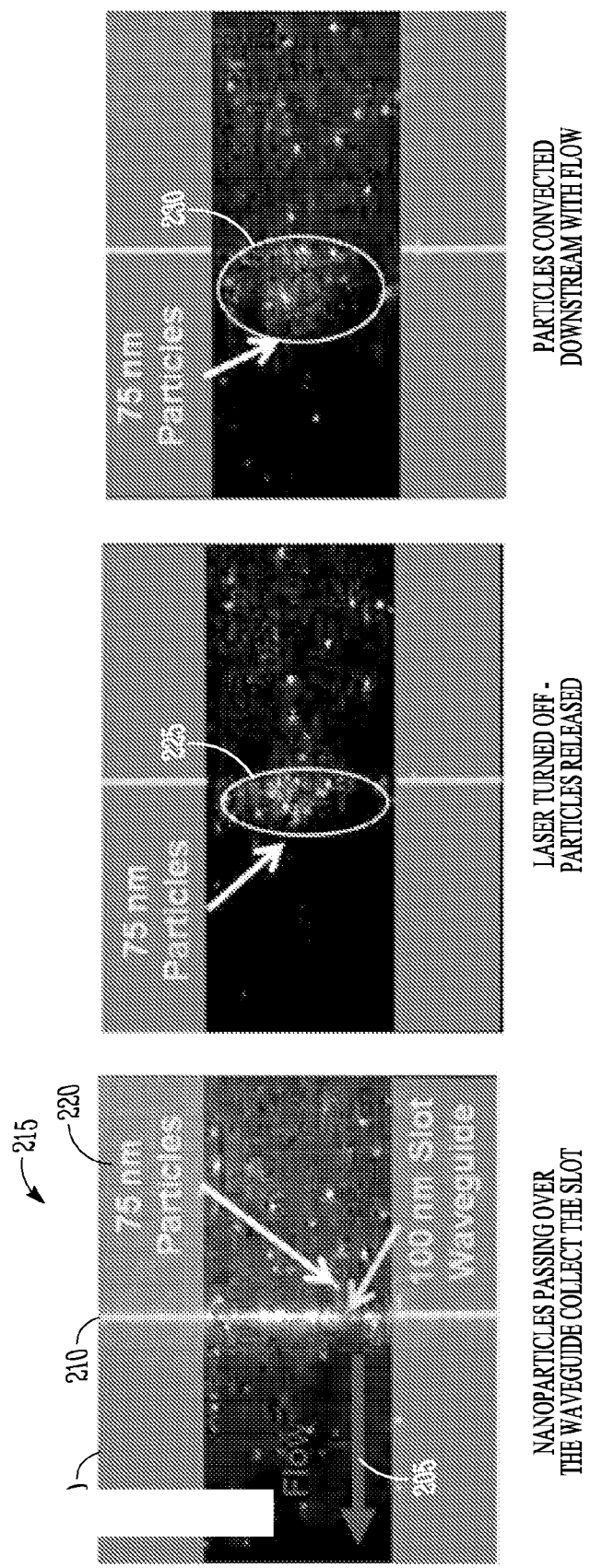
FIG. 2A is a top view of a time series showing particles passing over a slot waveguide according to an example embodiment.

FIG. 2A illustrates a series of top views of a section of a slot waveguide 200 with fluid flowing 205 over the top of the waveguide and transverse to the slot 210. In a first view 215 of the series, a laser provides light to the slot waveguide, resulting in the capture and stably trapping of polystyrene nanoparticles 220 (n=1.45) with diameters of 75 nm and 100 nm in slot waveguides with widths of 100 nm and 120 nm respectively. The optical power at the exit of a fiber used to couple light into the waveguide may be less than 300 mW, the excitation wavelength may be $\lambda=1550$ nm and trapping may be done using transverse-electric (TE) polarization.

Figure 2B:
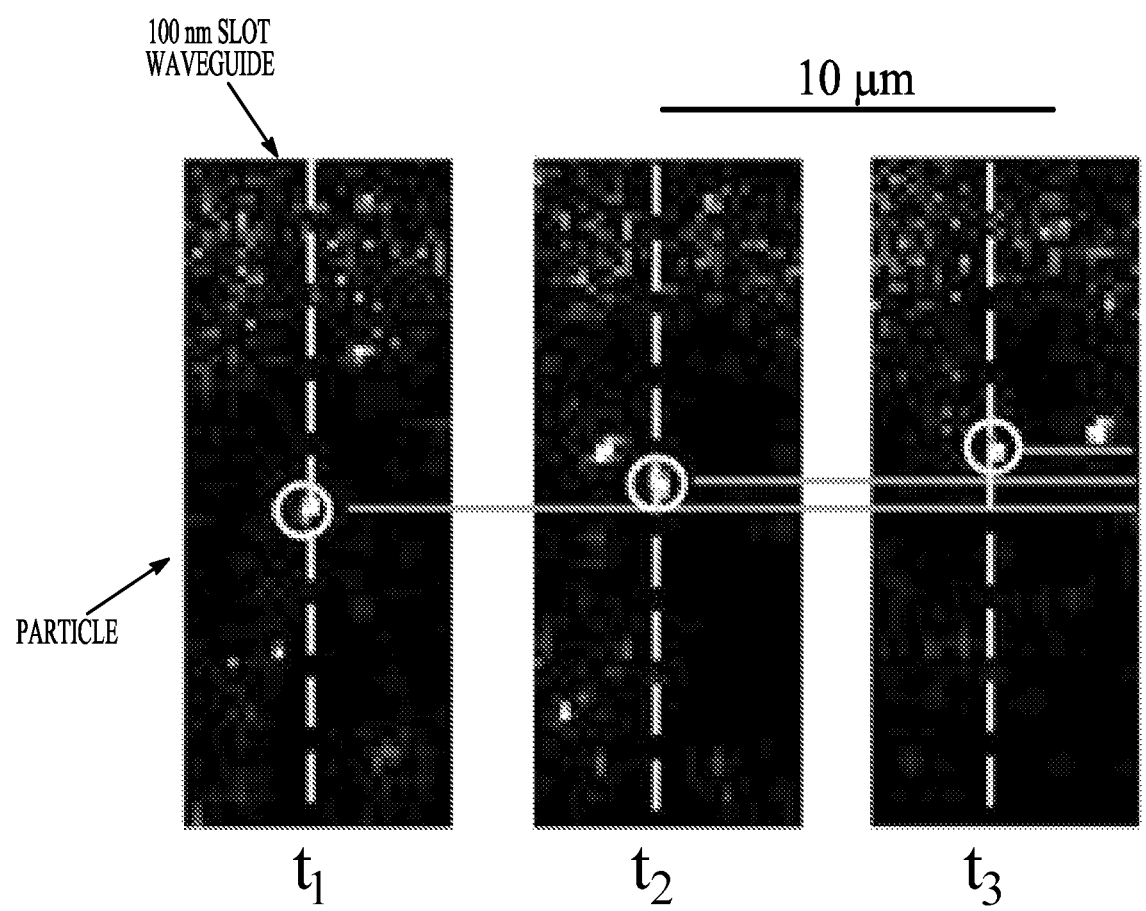
FIG. 2B is a top view of a time series showing particles being transported in the slot of a slot waveguide according to an example embodiment.
Figures 3A, 3B, 3C:
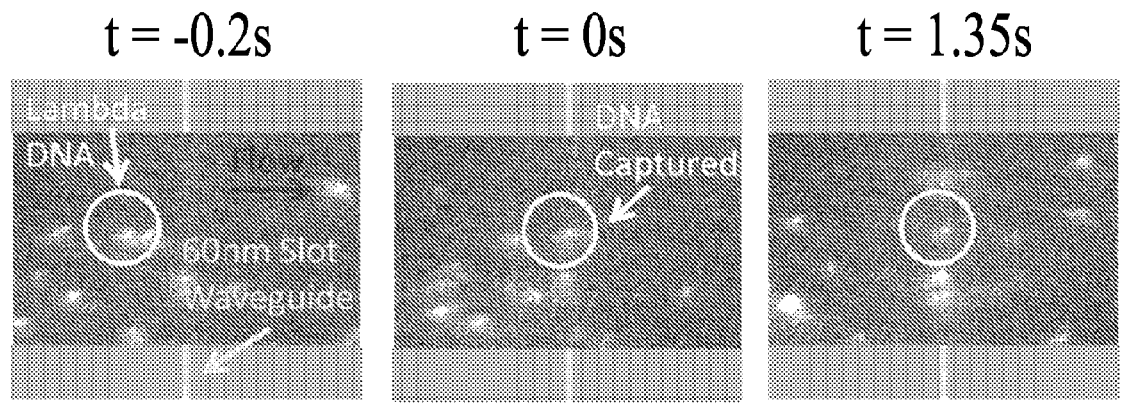
FIGS. 3A, 3B, 3C, 3D, 3E, and 3F are a time series of top views illustrating DNA capture and release over time according to an example embodiment.
Figures 3D, 3E, 3F:
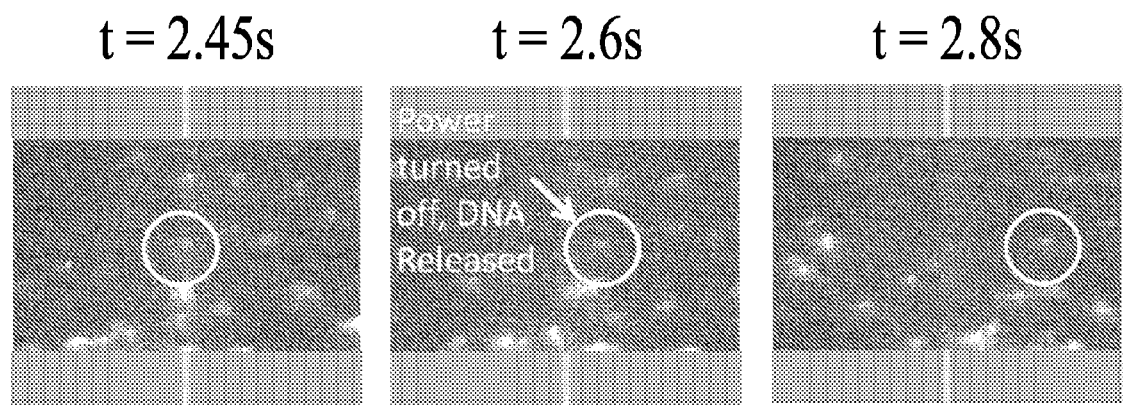

In one use of the a slot waveguide to trap particles, as shown in FIG. 2B, particles collect in the slot and also on the sides of the waveguide. In one embodiment, At t=0, the laser source is removed and particles are released from the waveguide. Immediately after release, a 'cloud' 225 of particles forms as the particles leave their trapping sites and the released particles are carried down the channel at 230 due to fluid flow. Trapped 100 nm nanoparticles in 120 nm slot waveguides are transported a short distance by radiation pressure. Note that the dimensions may be varied significantly in further embodiments. Time lapse images in FIG. 2B are cropped with contrast and brightness adjustments to the entire image. The cropping location is the same in each time-lapse image at t1, t2 and t3.

The system allows one to capture and accumulate flowing particles in the slot waveguide for indefinite periods of time and release them by either reducing the optical power or switching the polarization. Excitation of the slot waveguides using transverse-magnetic (TM) polarization required 3-5 times more power to obtain stable trapping hence switching polarization tended to break the trap. The microfluidic flow serves to transport the particles to the waveguide but does not play a role in the trapping itself. This is indicated by the fact that the trap breaks upon removal of the optical excitation in the above experiments. Additionally numerous control experiments showed that without waveguide excitation particle of any size may not become trapped.

The dynamics of the capture of flowing particles in a trap near the stability point (i.e. the point where the random thermal energy in the system is of the same order as the amount of work required to break the trap) are illustrated in a time sequence of top views of the slot waveguide with fluid flowing transverse to the waveguide in FIGS. 3A, 3B, 3C, 3D, 3E, and 3F. The average retention time in such a trap is a statistical process governed by the release kinetics of the system which in turn is governed by the trap strength, its stiffness and the location on the waveguide where the particle is trapped. An analysis of these release kinetics and their importance to enabling transport is provided below. In FIGS. 3A, 3B, 3C, 3D, 3E, and 3F, the nanoparticles are flowing by in the microchannel at an average speed of 80 μm/s in one embodiment, and as can be seen, at this speed the number of particles which are captured compared with those that flow by is relatively low (less than 25%). The reason for the low capture rate is that a particle must be on a streamline which passes through the evanescent field in order to be trapped. This is analogous to the condition that a flowing particle must be on a streamline which passes through the focal point of a free space optical tweezer in order to be trapped and not an inherent limitation of our system. If desired, the capture rate can be increased by decreasing the channel size (physically confining the particles closer to the slot waveguide), reducing the flow rate (allowing more time for particles to diffuse into the evanescent field) or increasing the optical power.

In one embodiment, individual YOYO tagged 48 kBb λ-DNA may be flowing over an optically excited 60 nm wide slot waveguide. At time t=0 the encircled DNA is trapped. In this case the DNA is released at the t=2.6 s mark and flows downstream. The sequence shows the collection of DNA molecules over time as optical power is supplied at t0s, and their release in response to removal of the optical excitation at t=2.6 s. Trapping conditions may be the same as those used in FIGS. 2A and 2B.

An additional advantage of some embodiments of this approach in comparison with other near field manipulation techniques is the ability to not only capture nanoscopic matter but optically transport it. This capability may be important for the development of active nano-assembly techniques and for optically driven bioanalytics. From Rayleigh theory it is well known that the radiation pressure based transport velocity of a dielectric nanoparticle is proportional to the local intensity and scales with the $5^{th}$ power of particle radius. As such it is extremely difficult to optically transport very small matter unless very high optical intensities, such as those obtainable with a slot waveguide, can be achieved. As shown in FIG. 2B optical propulsion of particles in the slot waveguides may be done at average speeds of 1.5 μm/s in one embodiment. In one embodiment a 100 nm polystyrene particle may be trapped with 250 mW excitation sources. Since the propulsion velocity inversely proportional to the forth power of wavelength, one method by which the transport velocity could be increased is by using a different high refractive index material that is transparent at lower wavelengths (e.g. amorphous silicon or silicon nitride).

Figure 4A:
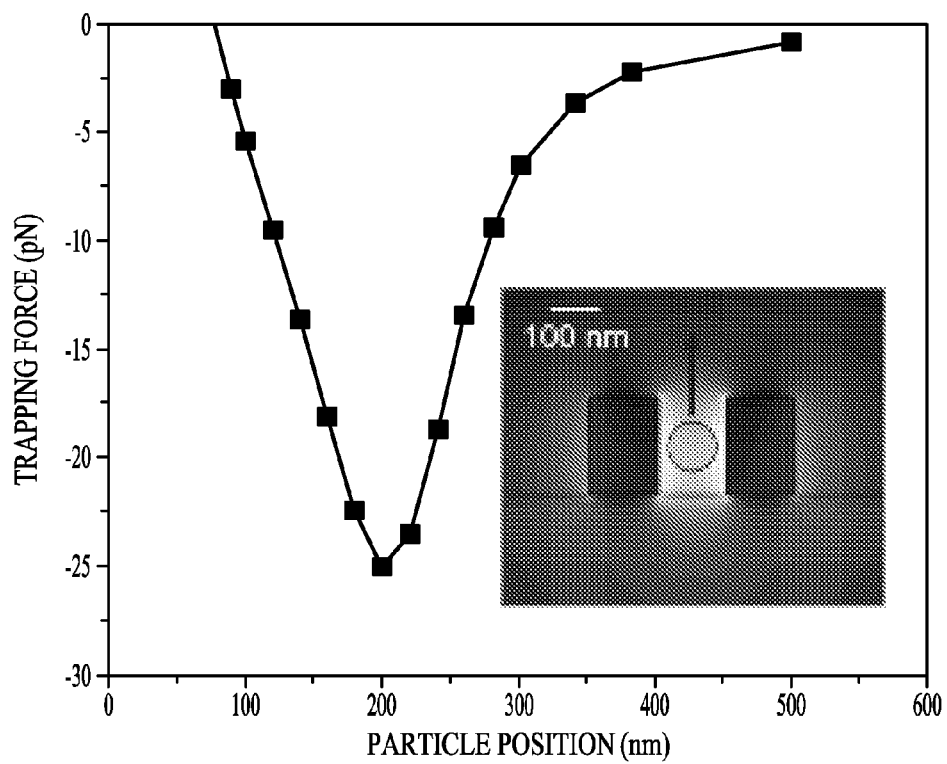
FIG. 4A is a graph of trapping force versus particle position for particles trapped within a slot of a slot waveguide according to an example embodiment.
Figure 4B:
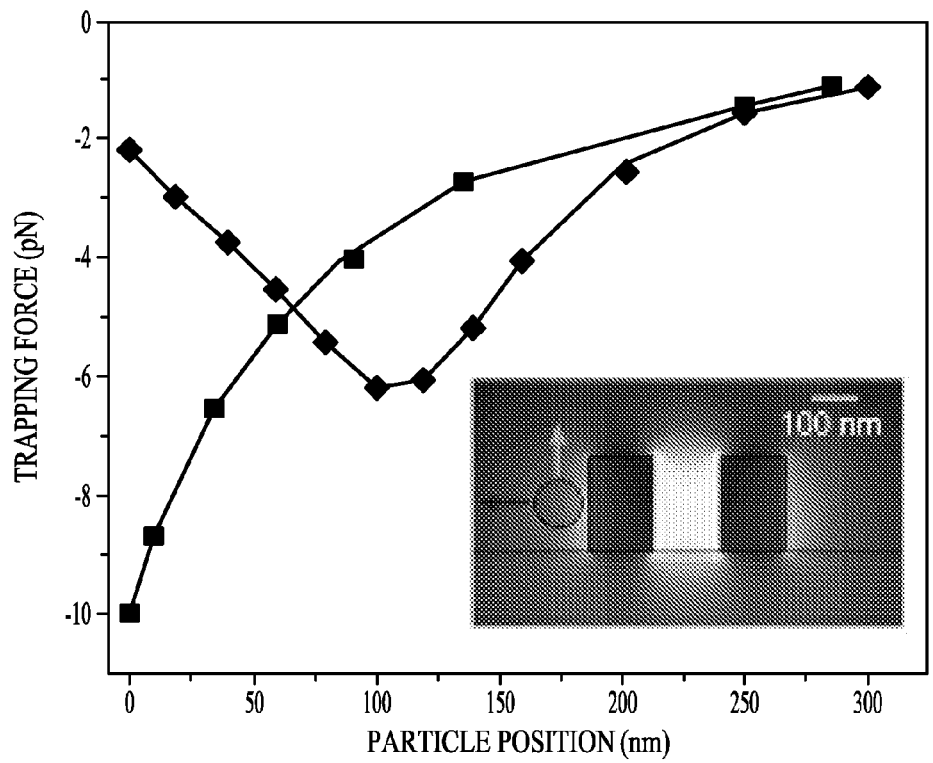
FIG. 4B is a graph of trapping force versus particle position for particles trapped on a side of a slot waveguide according to an example embodiment.

Nanoscopic dielectric particles can be considered as coarse approximate models for biological species such as viruses and very small bacteria. Of perhaps greater interest is the ability to capture and optically confine individual biomolecules. As shown in FIGS. 4A and 4B, the system is able to both capture from solution and stably trap individual strands of YOYO-1 tagged 48 kb long λ-DNA molecules. As in the previous cases, trapping may be done with 250 mW of optical power at 1550 nm optical excitation. However in one embodiment, a 60 nm slot waveguide may be used. When the power is removed the DNA are released.

In one embodiment, buffer and pH conditions in which the DNA is known to be in a partially extended state may be used. Although the ability to optically trap λ-DNA at pHs where the molecule is known to be in a supercoiled state has been done, it has proven difficult to trap partially extended molecules because the focal point of a tightly focused tweezer can only interrogate a small portion of the molecule. The slot waveguide technique allows trapping of extended molecules since the confinement force is equivalently applied along a line rather than at a point. Further development of the transport technique may also enable novel biomolecular separation mechanisms and new methods of interrogating single molecules for rapid sequencing or direct haplotyping.

To better characterize the trapping stability, stiffness and release kinetics a detailed 3D numerical analysis of the system is set forth below. Referring back to FIGS. 2A and 2B, while the majority of particles were observed to trap in the high-intensity slot region, trapping was also observed along the sides of the slot waveguide structure. Since the trap strength is related to the local optical field intensity, the behavior of particles trapped in the two different regions may be compated to gauge the effect on trapping stability. Finite-element simulations may be used to calculate the relative trapping force for a side-trapped particle compared to one trapped in the slot, as shown in FIGS. 4A and 4B respectively. As can be seen, the trapping force for side-trapped particles is much smaller, and as a result, a lower amount of work energy is required to exceed the trapping release barrier. This provides an avenue to differentiate the two scenarios, as it is expected that side-trapped particles would release more easily than their slot-trapped analogues. FIGS. 4A and 4B also illustrate that the slot waveguide optical mode is not greatly perturbed by the presence of the particle in either position.

The amount of work to release a particle from the trap may be found by integrating the force curves from the particles stable trapping position to infinity. Inset images are of a calculated electric field with the particle in its stable trapping position. The arrows indicate the direction of release. FIG. 4A is a plot of trapping force for a 100 nm particle in a 120 nm slot versus its position relative to the height of the slot waveguide. The particle position is measured as the distance of the particle center from the bottom of the 200 nm tall slot waveguide. The trapping force reaches a maximum at the point where the field gradient is strongest at the entrance to the slot waveguide. FIG. 4B is a plot of trapping force for a 100 nm particle side-trapped in the same structure with two possible release paths. Particle position is measured as the deviation of the particle center from its most stable position. The rising line corresponds to a particle being pushed off the waveguide due to an external force, while the "v" shaped line corresponds to a particle being lifted up off the waveguide. The trapping forces listed are normalized to 1 W of guided power.

Because the direction of trap release is in the vertical direction, the physical confinement provided by the channel walls and the fact that the trapping force does not vary along the length of the waveguide, it is difficult to extract quantitative values for the trapping stability experimentally. From the numerical computations however one can estimate the trap stiffness from the slope of the force distance curve as being 0.2 pN/nm for a 100 nm nanoparticle at 1 W excitation power. Though a direct comparison is difficult, the force is significantly higher than what others have described for larger particles using other near field techniques.

For a particle in an optical near field, there is a finite amount of work energy required to remove a particle from a stably trapped location to one where the trap no longer has any influence. When trapping is relatively weak and the particles small, the random thermal energy in the system will eventually exceed this work and the particle will be released. In such cases, the theoretical work energy is analogous to an activation energy barrier that impedes the release of particles from the waveguide and the kinetic behavior is similar to molecular desorption from a surface. Understanding how related parameters such as slot width, and particle composition and size affect the release rate of trapped nanoparticles, yields information useful to the engineering of robust, stable slot transport devices.

Figure 4C:
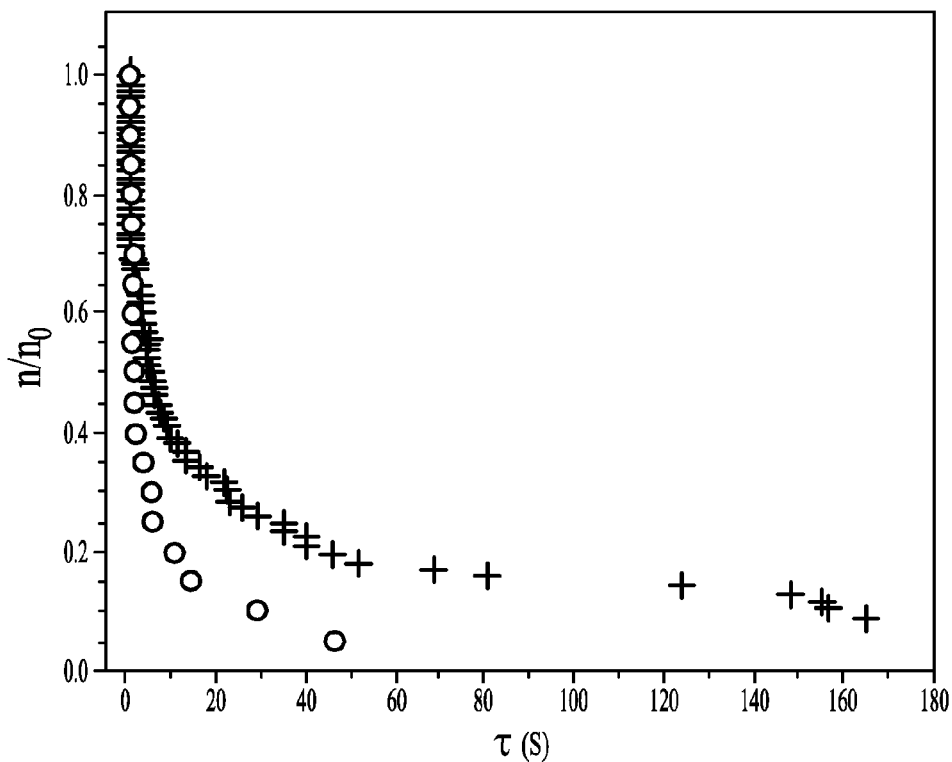
FIG. 4C is a plot of $n/n_0$ to the intensity and time normalized factor $\tau$ for particles trapped in a slot according to an example embodiment.
Figure 4D:
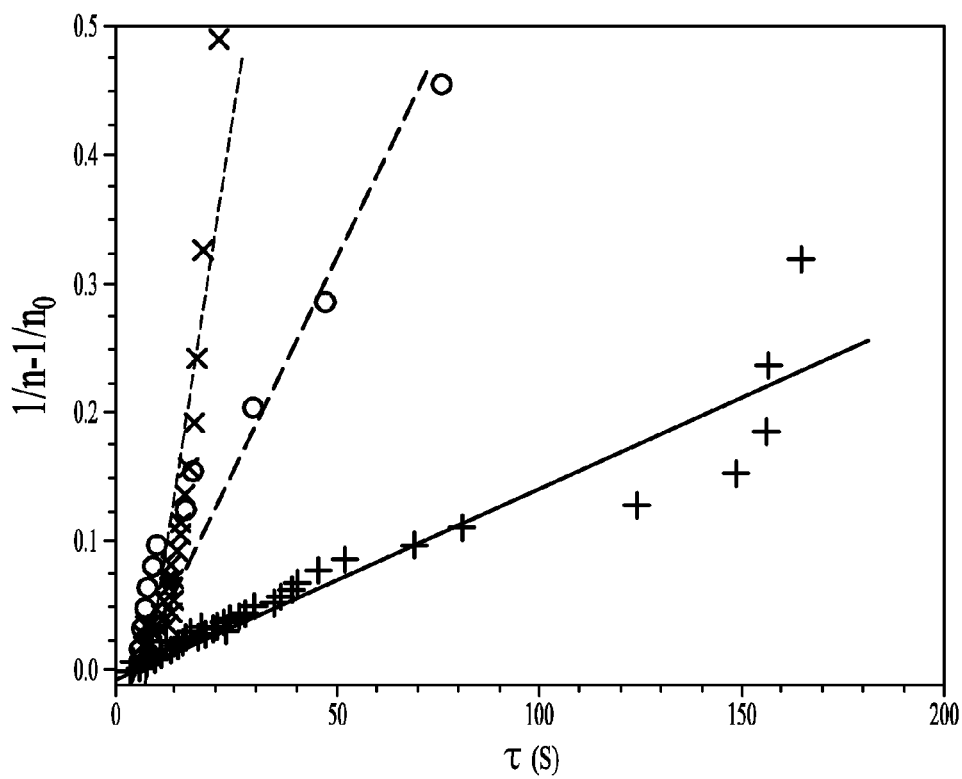
FIG. 4D is a plot of F(n) for a second order rate law $(1/n-1/n_0)$ to $\tau$ for particles trapped in a slot according to an example embodiment.

FIG. 4C is a plot of $n/n_0$ to the intensity and time normalized factor $\tau$. Particles trapped in the slot are represented by crosses, side-trapped particles are represented by circles, and DNA by the x's. $n/n_0$ represents the relative 'concentration' of particles currently trapped on the waveguide. FIG. 4D is a plot of F(n) for a second order rate law ($1/n-1/n_0$) to $\tau$. The same symbols are used here as in FIG. 4C. The lines represent linear fits to the data from which the release rate constant can be obtained. In this case sharper slopes represent a higher release rate and therefore a less stable trap.

A large number of trapping experiments were conducted for nanoparticles trapped inside the slot, nanoparticles trapped outside the slot, and the trapped DNA. Trapping was done near the stability point such that the targets would self-release from the waveguide structure. FIG. 4C shows a plot of the total number of trapped targets on the waveguide as a function of normalized time. The average release time for particles trapped inside the slot is larger than the average release times for particles trapped outside suggesting greater stability, consistent with earlier numerical predictions. In one embodiment, the trapping stability may be related to a kinetic constant, k, which can be obtained by plotting the above data as a function of reduced time for an appropriate rate law.

In FIG. 4D side-trapped particles are seen to have a larger rate constant, suggesting the release (desorption) is faster and a lower work energy may cause for release. The cause behind why the release process appears to exhibits a second-order rate may result from the exponential decay of the electromagnetic trapping force coupled with hydrodynamic drag. DNA exhibits a lower stability than the polystyrene nanoparticles, likely because of the extended conformation it obtains during trapping. Since the trapping stability is likely to be strongly dependent on molecular conformation, analysis of the release kinetics in such systems may result in a new method of single molecule analysis.

Figure 5:
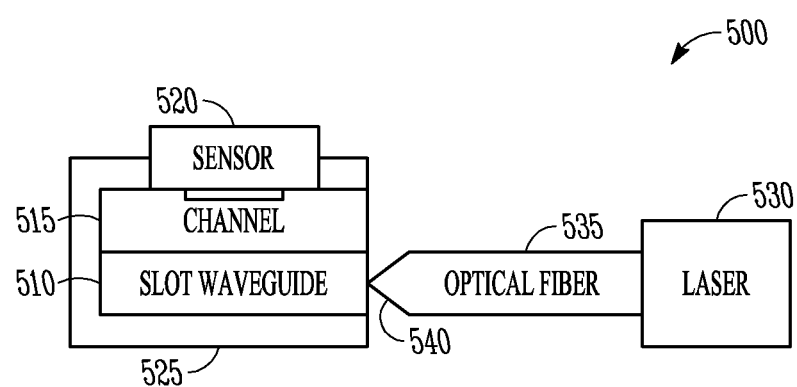
FIG. 5 is a block diagram of a system illustrating a slot waveguide coupled to an optical power source and sensor according to an example embodiment.

FIG. 5 is a simplified block diagram of a system 500 that includes a slot waveguide 510 having a slot exposed to a channel 515 for providing a fluid containing particles to be trapped and sensed by a sensor 520. The sensor 520 may be a camera or other type of device capable of detecting desired particles, such as a spectrometer or other passive or active type of sensor. In one embodiment the sensor 520 is compatible with lab on a chip type systems. The waveguide 510 and channel 515 are supported on a substrate 525. A laser 530 or other optical power source is illustrated and coupled to an optical fiber 535 with a nanotaper 540 to coupled the optical power to the slot waveguide. The drawing is not to scale.

In one embodiment for experiments referenced above, slot waveguide chips may be fabricated using an electron beam lithography process. Other processes may be used as appropriate. The chips may be cleaned using a stabilized formulation of Sulphuric Acid and Hydrogen Peroxide compounds, such as Nano-Strip™, and may be descummed using a reactive ion oxygen plasma etching process. In one embodiment, the total width of the waveguides may be approximately 450 nm, with slot widths ranging from 60 nm to 120 nm. May different width waveguides may be used in various embodiments as desired. The slot waveguides may be transitioned to nanotaper devices clad in silicon oxide to increase the coupling efficiency. In one embodiment, a laser source included a tunable 1550 nm laser that runs to a tapered lens fiber.

Particle solution in one embodiment includes suspended fluorescent polystyrene nanoparticles 75 and 100 nm in diameter (Duke Scientific) with a refractive index n-1.574 in a 100 mN phosphate buffer solution. The particles have about a 10% dispersity in particle diameter. The high ionic concentration of the buffer solution suppresses electrostatic interactions in the system and maintains a constant pH during experiments. 1% v/v Triton X-100 non-ionic surfactant was added to the particle solution to prevent aggregation of the nanoparticles and to limit adhesion of particles to the surface of the devices and PDMS microchannels.

Experiments conducted used devices that were bonded to a PDMS microchannel 100 μm wide and 5 μm tall. The fluidics were driven using an adjustable air-pressure system designed to maintain a constant pressure to the device. The power output of the fiber during the trapping experiments was set from 250 to 300 mW of power. Particle trapping was confirmed by counting immobilized particles and counting the number of released particles. Particle velocity measurement and particle trapping times were determined using an ImageJ particle tracking software. Images of the experiments were captured at a rate of 55 ms per frame using a SensiCam CCD camera.

Experiments demonstrating λ-DNA trapping were conducted using the above techniques, with the exception of a smaller 60 nm wide slot waveguide. The λ-DNA molecules (New England BioLabs) were stained with YOYO-1 (Molecular Probes) intercalating dye so that they could be observed using traditional fluorescence microscopy. The buffer consisted of 10 mM Tris Base (J. T. Baker), 1 mM EDTA, and 10 mM sodium Chloride (Mallinckrodt Chemicals) at a pH of 7.8. Poly(n-vinylpyrrolidone) (PVM, Sigma) 2% (w/w) was added to reduce unspecific binding of DNA to channel walls.

A detailed numerical analysis is provided to relate the near field optical forces to release kinetics. The amount of work required to release a trapped particle from the slot waveguide is directly related to the amount of force applied to the particle as it leaves the trapping region. This work energy required to release the particle can be thought of as an activation energy barrier to the particles release, an analogy to traditional molecular desorption theories. As a result, it is possible to characterize the rate constant for such a release mechanism using an Arrhenius law for a single particle system:

$$k = A \exp\left(-\frac{W_{trap}}{k_B T}\right) \quad (1)$$

where k is the particle release rate constant, A is the Arrhenius constant, $W_{trap}$ is the work required to release a particle from a slot waveguide, $k_b$ is Boltzmann's constant, and T is the temperature of the system.

It has been shown that $W_{trap}$ scales linearly with the optical intensity in a waveguide:

$$\bar{k} = k_0 \exp\left(\frac{P}{P_0}\frac{A_0}{A}\right) \quad (2)$$

where $k_0$ represents a baseline rate constant, P is the optical power coupled in the waveguide, $P_0$ is a baseline power, A is the cross-sectional area of the slot, and $A_0$ is a baseline area.

The rate at which particles release can be written using a rate law:

$$\frac{dn}{dt} = -kn^x \tag{3}$$

where n is the number of particles trapped and x is a whole number representing the order of the desorption process.

The solution of the differential equation would be of the form:

$$F(n) = k_0 \tau \tag{4}$$

$$\tau = \exp\left(\frac{P}{P_0}\frac{A_0}{A}\right) t \tag{5}$$

where F(n) is some function of n and τ is an intensity normalized time.

The equations above are similar to the Polanyi-Wigneri equations for gas desorption from a surface, but written here for the desorption of single particles as opposed to large numbers of gas molecules. This assumption is only valid for the case where the surface coverage of the total number of particles is relatively small such that they don't interfere with one another.

In addition to molecular analysis and separation uses, the system may also be used in emerging fields, such as nano-assembly, offer the advantages of optical tweezing, but more rapidly and with sub-wavelength precision. The ability to control the degree of trapping and repulsion into nanophotonic devices may also have significant impact on the telecommunications industry. The diffusion time for a particle to be released from within a slot of a slot waveguide is on the order of $10^{-6}$ s, compared to 10 ms to 100 ms timescales for electromechanical switches.

The Abstract is provided to comply with 37 C.F.R. §1.72(b) to allow the reader to quickly ascertain the nature and gist of the technical disclosure.

The invention claimed is:

1. A system comprising:
    a slot waveguide containing a slot providing high optical confinement and forming a channel for transport of at least one particle, wherein the slot is sandwiched between two walls, a refractive index of the two walls being greater than a refractive index of the slot;
    a channel outside the slot waveguide and coupled to the slot waveguide for providing a fluid having particles to the slot; and
    an optical power source to provide optical power to the slot waveguide to exert first optical forces transverse to the slot to trap the particles within the slot of the slot waveguide.

2. The system of claim 1 wherein the channel provides fluid flowing transverse to the slot.

3. The system of claim 1 wherein the slot is between 40 nm and 200 nm in width.

4. The system of claim 1 wherein the particles comprise at least partially uncoiled proteins or DNA.

5. The system of claim 1 wherein the optical power is to exert second optical forces along the slot to transport the particles along the slot.

6. The system of claim 1 wherein the optical power is concentrated in an eigenmode in the slot.

7. The system of claim 1 and further comprising a cover positioned over at least a portion of a length of the slot.

8. A method comprising:
    providing fluid containing particles to a slot waveguide by using a channel outside the slot waveguide and coupled to the slot waveguide;
    providing optical power to the slot waveguide to exert first optical forces transverse to a slot of the slot waveguide on the particles to trap the particles within the slot of the slot waveguide, wherein the slot is sandwiched between two walls, and wherein a refractive index of the two walls is greater than a refractive index of the slot, and wherein the slot provides high optical confinement and forms a channel within the slot for transport of at least one particle.

9. The method of claim 8 wherein the particles are released from the slot when optical power is removed.

10. The method of claim 8 wherein the particles in the slot are transported along the slot by second optical forces along the slot exerted by the optical power.

11. The method of claim 8 wherein the optical power is confined in the slot in an eigenmode of propagation.

12. The method of claim 8 wherein particles are fluidically transported into the slot through longitudinal fluid flow.

* * * * *